(12) United States Patent
Mayringer et al.

(10) Patent No.: US 8,685,139 B2
(45) Date of Patent: Apr. 1, 2014

(54) METHOD FOR SMELTING FRAGMENTIZED ALUMINUM SCRAP

(75) Inventors: Hubert Mayringer, St. Georgen (AT); Günther Hertwich, Braunau am Inn (AT); Franz Niedermair, Braunau am Inn (AT)

(73) Assignee: Hertwich Engineering GmbH, Braunau (AT)

( * ) Notice: Subject to any disclaimer, the term of this patent is extended or adjusted under 35 U.S.C. 154(b) by 1069 days.

(21) Appl. No.: 11/884,423

(22) PCT Filed: Feb. 24, 2006

(86) PCT No.: PCT/AT2006/000082
§ 371 (c)(1),
(2), (4) Date: Aug. 15, 2007

(87) PCT Pub. No.: WO2006/089332
PCT Pub. Date: Aug. 31, 2006

(65) Prior Publication Data
US 2008/0257111 A1    Oct. 23, 2008

(30) Foreign Application Priority Data
Feb. 24, 2005  (AT) ...................... 313/2005

(51) Int. Cl.
*C22B 21/00*    (2006.01)
(52) U.S. Cl.
USPC ........................... 75/687; 266/161

(58) Field of Classification Search
USPC ........................ 432/30, 48; 75/687; 266/161
See application file for complete search history.

(56) References Cited

U.S. PATENT DOCUMENTS

| 4,010,935 A | 3/1977 | Stephens |
| 4,676,742 A | 6/1987 | Kozierok et al. |
| 4,824,364 A * | 4/1989 | Kobari et al. ................ 432/30 |

FOREIGN PATENT DOCUMENTS

| DE | 34 44 181 A1 | 8/1985 |
| EP | 0 787 810 A | 8/1997 |
| JP | 62 225889 A | 10/1987 |
| JP | 07 324870 A | 12/1995 |

OTHER PUBLICATIONS

International Search Report, Jul. 27, 2006.

* cited by examiner

*Primary Examiner* — Weiping Zhu
(74) *Attorney, Agent, or Firm* — Collard & Roe, P.C.

(57) ABSTRACT

A method is described for smelting fragmentized aluminum scrap, with the aluminum scrap to be smelted being molten in a furnace after thermal pre-treatment in a hot-gas stream. In order to provide advantageous process conditions it is proposed that the aluminum scrap is subjected at first in a continuous flow of material to the thermal treatment and is smelted thereafter, and that from the hot gas stream guided in a circulation for the thermal treatment of the aluminum scrap a partial stream is branched off and is guided into the furnace.

9 Claims, 2 Drawing Sheets

METHOD FOR SMELTING FRAGMENTIZED ALUMINUM SCRAP

CROSS REFERENCE TO RELATED APPLICATIONS

Applicants claim priority under 35 U.S.C. §119 of Austrian Application No. A 313/2005 filed Feb. 24, 2005. Applicants also claim priority under 35 U.S.C. §365 of PCT/AT2006/000082 filed Feb. 24, 2006. The international application under PCT article 21(2) was not published in English.

1. FIELD OF THE INVENTION

The invention relates to a method for smelting fragmentized aluminum scrap, with the aluminum scrap to be smelted being molten in a furnace after thermal pre-treatment in a hot-gas stream.

2. DESCRIPTION OF THE PRIOR ART

Fragmentized aluminum scrap, especially aluminum chips, but also scrap from cans or foil, generally show organic impurities in the form of cutting media, oils, lacquers, plastics and the like which during the smelting of aluminum scrap lead to the sudden release of considerable quantities of carbonization gases which impair the conduction of the process. For this reason, the aluminum scrap to be smelted is subjected to a thermal pre-treatment in order to remove the organic impurities with the help of hot gases. The carbonization gases which are obtained thereby and contain hydrocarbons are supplied to after-burning. The disadvantageous aspect in this thermal pre-treatment of the aluminum scrap to be smelted which usually occurs in rotary drums is the relatively high need for energy and the loss of energy by cooling of the scrap as a result of the intermediate storage of the pre-treated aluminum scrap, which furthermore promotes the condensation of air humidity on the intermediately stored aluminum scrap with the disadvantage that during the subsequent smelting of the aluminum scrap the hydrogen content of the melt is increased and the oxygen leads to an additional oxidation of the aluminum scrap and thus to a loss of metal.

SUMMARY OF THE INVENTION

The invention is therefore based on the object of providing a method for smelting fragmentized aluminum scrap of the kind mentioned above in such a way that the need for energy can be reduced substantially under advantageous process guidance.

This object is achieved by the invention in such a way that aluminum scrap in a continuous flow of material is subjected at first to the thermal treatment and is smelted thereafter, and that from the hot gas stream guided in a circulation for the thermal treatment of the aluminum scrap a partial stream is branched off and is guided into the furnace.

Since as a result of these measures the aluminum scrap is subjected to thermal treatment at first in a continuous flow of material and is then smelted, the otherwise used intermediate storage is omitted, so that the disadvantages linked to such an intermediate storage concerning energy loss by cooling on the one hand and oxidation-induced metal losses on the other hand are avoided. An additional factor is that the hot gases for heat treatment of the aluminum scrap are guided in a circulation, thus reducing the need for energy for the heat treatment. Since a partial stream of the hot gas stream which is enriched with carbonization gases is guided into the furnace and the carbonization gases are combusted there, the carbonization gases can easily provide a part of the required smelting energy, which thus further reduces the total need for energy.

The heat losses of the hot gases caused by the heat treatment of the aluminum scrap must be offset by a respective supply of heat. If the quantity of the partial stream branched off to the furnace exceeds the amount of obtained carbonization gases, it is also necessary to replace the gas loss. These requirements can be fulfilled advantageously in such a way that hot combustible gases are fed into the circulation of the hot gas stream. Instead of the hot combustible gases it also possible to introduce hot exhaust gases from the furnace into the hot gas circulation, as a result of which the process sequence is simplified in addition because separate burners can be omitted.

For performing the smelting method, a drier for fragmentized aluminum scrap which can be supplied with hot gases and a furnace for smelting the aluminum scrap heat-treated in the drier are used. It is merely necessary to connect the drier to the furnace and include it in a hot-gas circulation, from which a branch line opens into the furnace in order to convey the aluminum scrap directly after its thermal treatment in the drier without any heat losses to the furnace on the one hand and to enable the energetic utilization of the carbonization gases obtained during the thermal treatment of the aluminum scrap for the smelting of the aluminum scrap.

At least one burner can be provided for heating the hot gases guided in a circulation, whose hot combustible gases are introduced into the hot gas stream. A separate burner for heating the hot gases can be omitted however when the hot gas circulation is connected to a feed line for hot exhaust gases from the furnace which can also be used for compensating heat and gas losses.

As a result of the dependence of the oxidation processes on the dwell time of the aluminum scrap in the drier, it is necessary to ensure favorable heat transfer from the hot gases to the aluminum scrap. The drier may comprise a conveyor with a gas-permeable receptacle for the conveyed material for this purpose, through which the hot gas stream guided in a circulation is drawn off, so that the bed of material is flowed through from top to bottom by the hot gases. Said guidance of the hot gases ensures a substantially even heat transfer over the height of the bed of material, thus allowing for comparatively short treatment periods. In order to improve the heat transfer, the drier can be formed from a conveying section for the aluminum scrap with the hot gas stream as the conveying means, with a cyclone separator for the heat-treated aluminum scrap being connected to the conveying section in order to separate the aluminum scrap from the hot gas stream and to guide the same into the furnace. The use of such a drier depends on the particle size of the aluminum scrap however, because said aluminum particles need to be moved in a floating manner with the hot gas stream as the conveying means along the conveying section under intimate mixture with the hot gases.

BRIEF DESCRIPTION OF THE DRAWINGS

The method in accordance with the invention for smelting fragmentized aluminum scrap will be explained below in closer detail by reference to the drawing, wherein.

DESCRIPTION OF THE PREFERRED EMBODIMENTS

Figure 1:
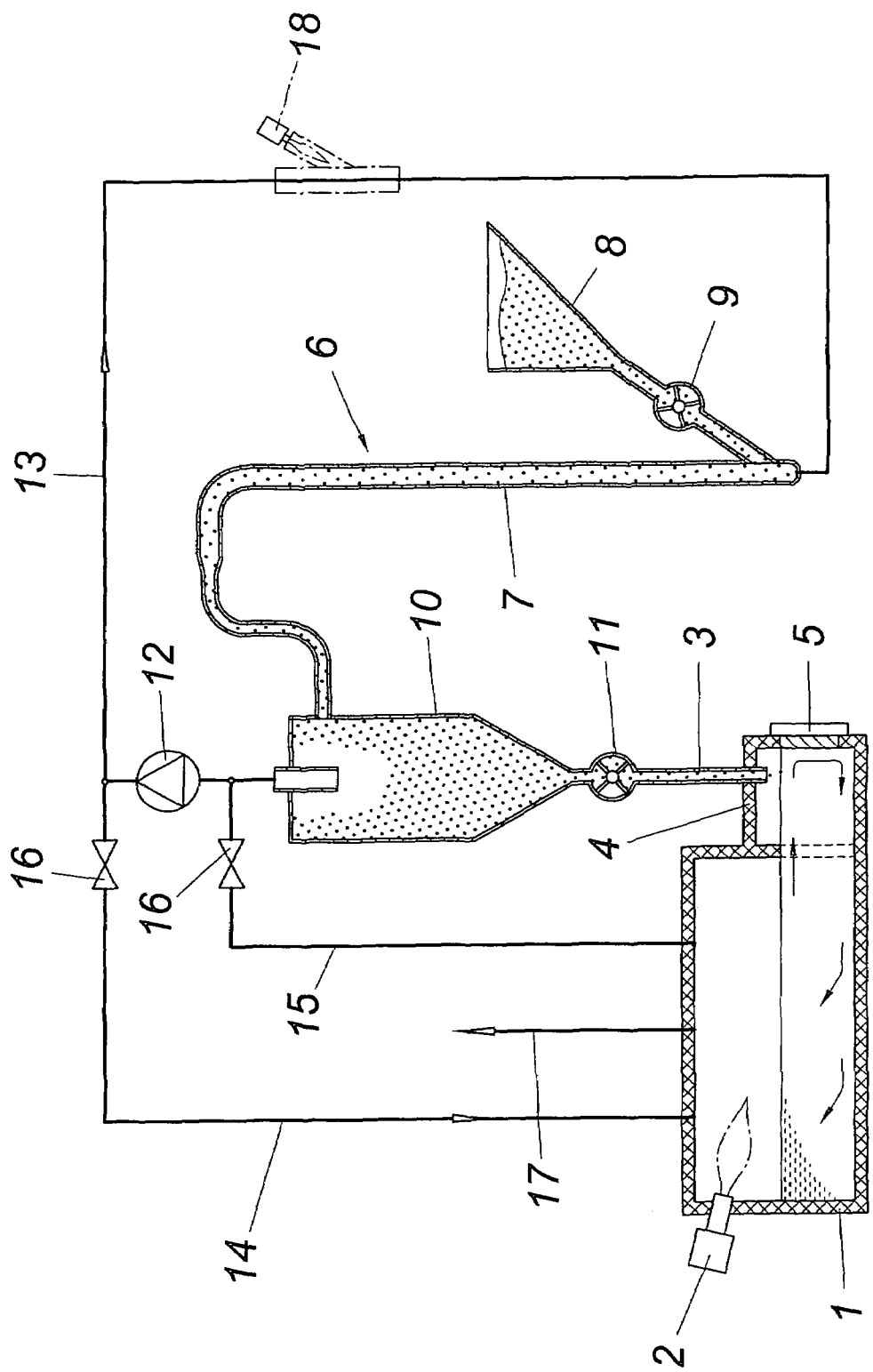
FIG. 1 shows an apparatus in accordance with the invention for smelting fragmentized aluminum scrap in a schematic block diagram.

In accordance with FIG. 1, the illustrated apparatus for smelting aluminum scrap, and aluminum chips in particular, comprises a furnace 1 which is heated with the help of at least one burner 2. The aluminum scrap is supplied to the furnace via a drop shaft 3, which occurs in the region of a furnace pocket 4 which is equipped with an inductor 5 whose electromagnetic field induces a downwardly directed flow of the bath of already smelted aluminum scrap, so that the scrap parts falling from the drop shaft 3 into the furnace 1 are grasped by the bath flow and are pulled beneath the bath surface, which is relevant in view of oxidation processes which are otherwise possible. The aluminum scrap needs to be subjected to a thermal pre-treatment prior to smelting, which is performed in a drier 6 provided upstream of the furnace 1. In the case of the embodiment according to FIG. 1, said drier 6 consists of a conveying section 7, to which the scrap to be treated is supplied in a dosed manner from a storage container 8 via a cellular wheel sluice 9. The fragmentized aluminum scrap is conveyed with the help of a hot gas stream along the conveying section 7 in order to ensure an intimate mixture between the hot gas and the scrap particles and thus a favorable and rapid heat transfer to the scrap particles. After passing through the conveying section 7, the aluminum scrap is separated from the hot gas stream with the help of a cyclone separator 10, from which the drop shaft 3 is supplied with aluminum scrap via a cellular wheel sluice 11. The hot gases which receive the hydrocarbon-containing carbonization gases which are obtained during the heat treatment of the aluminum scrap are removed from the cyclone separator 10 with the help of a blower 12 and supplied in a circulation 13 to the conveying-section 7 again. A partial stream of the hot gases-enriched with carbonization gases is removed from the circulation 13 via a branch line 14 and supplied to the furnace 1 in order to combust the share of carbonization gases in the furnace 1, whose atmosphere usually contains an oxygen content in the region of 1 to 8%.

In order to heat the hot gases, the hot gas circulation 13 is connected to a feed line 15 for hot furnace gases which are admixed to the hot gas stream in circulation 13. Not only the heat losses of the hot gas stream are compensated which are caused by the heat treatment of the aluminum scrap in drier 6, but also the gas loss by separating a partial gas stream from the circulation 13. The mass flows can be adjusted accordingly to the respective requirements by control valves 16 in the branch line 14. The exhaust gases of the furnace which are not required for heating the hot gases are removed in a conventional manner via an exhaust gas line 17 from the furnace. Instead of the hot furnace gases, the hot gases in circulation 13 can also be heated by a burner 18 whose hot combustible gases are mixed with the hot gases in circulation 13, as is indicated in FIG. 1 in a dot-dash line.

Figure 2:
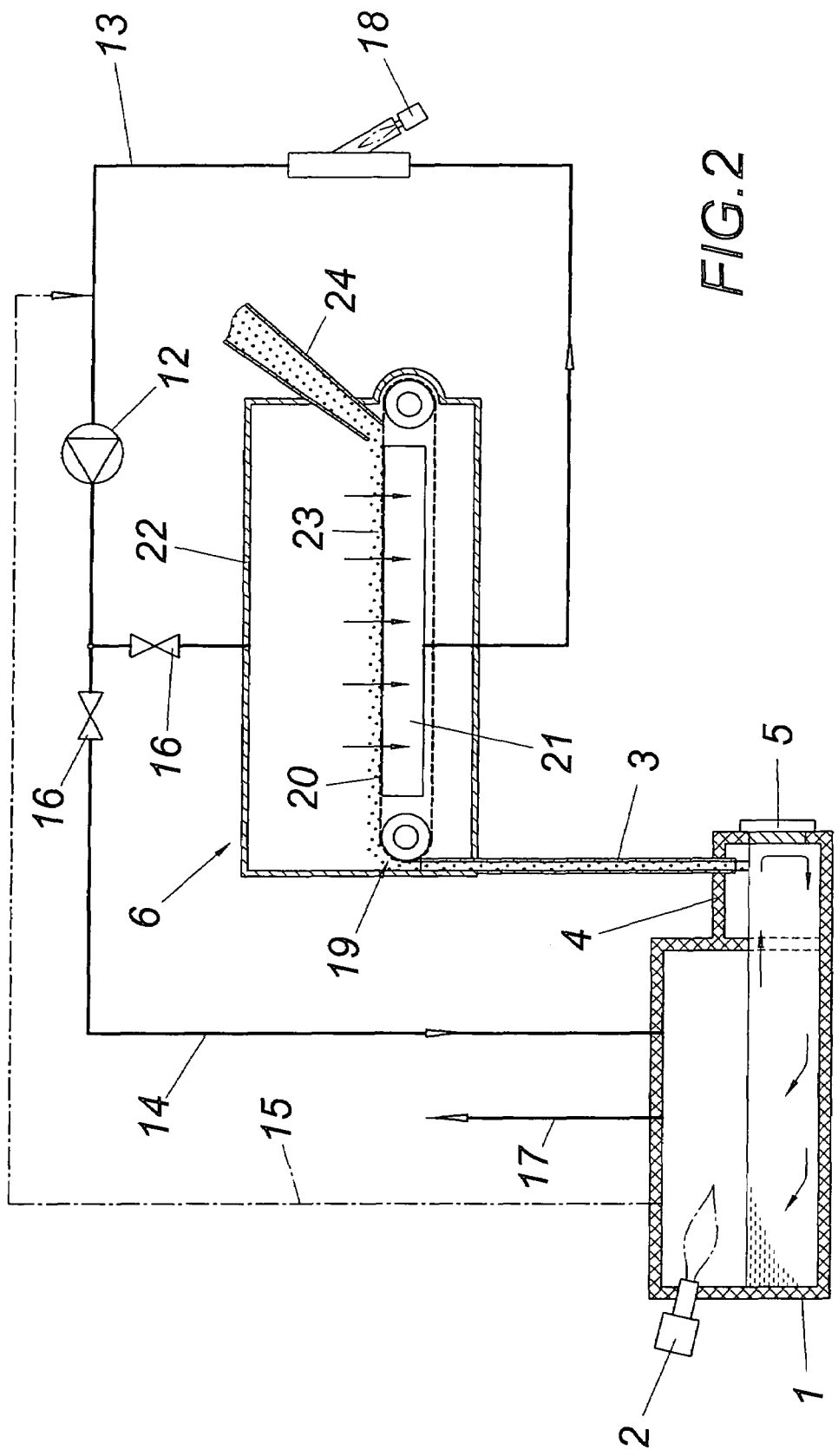
FIG. 2 shows an illustration according to FIG. 1 of an embodiment of an apparatus in accordance with the invention.

The apparatus according to FIG. 2 differs from that of FIG. 1 substantially only by the arrangement of the drier 6. Said drier 6 comprises a conveyor 19 with a gas-permeable receptacle for the conveyed material in the form of a revolving belt whose conveying strand 20 forming the receptacle for the conveyed material upwardly seals a suction box 21. Since the housing 22 of the drier 6 is connected to the pressure side and the suction box 21 to the suction side of blower 12 of circulation 13 for the hot gas flow, the hot gas flow is sucked through the bed of material 23 on the conveying strand 20 of the conveyor 19, which in the case of an even height of the bed leads to an even heating of the aluminum scrap, which is applied to the conveyor 19 via a gravity chute 24. After the heat treatment, the aluminum scrap is dropped from the conveyor 19 into the drop shaft 3 in order to be smelted in the manner as described in connection with FIG. 1. The hot gases in circulation 13 are heated by a burner 18 whose hot combustible gases mix with the hot gases of circulation 13. It is also possible to perform the heating of the hot gases with the help of the hot exhaust gases of the furnace, as is indicated by a feed line 15 indicated in a dot-dash manner for such exhaust gases from a furnace. The combustion of the carbonization gases obtained during the heat treatment of the aluminum scrap in drier 6 occurs in a manner analogous to the embodiment in accordance with FIG. 1, such that a partial stream of the hot gases enriched with carbonization gases is supplied via branch line 14 from the circulation 13 of the hot gases and is supplied to furnace 1.

The invention claimed is:

1. A method for producing aluminum metal from fragmented aluminum scrap, the method comprising the steps of:
   thermally pre-treating a first continuous flow of aluminum scrap in a hot gas stream, the hot gas stream being directed in and recirculated in an enclosed continuous circuit, said enclosed continuous circuit not passing through a furnace;
   after the pre-treating, separating from the enclosed continuous circuit the aluminum scrap such that a second continuous flow of the aluminum scrap is formed;
   after the pre-treating, branching off a portion of gas from the enclosed continuous circuit such that a partial gas stream is formed;
   adding the partial gas stream to the furnace;
   after the separating, adding to the furnace the second continuous flow of the aluminum scrap; and
   smelting the aluminum scrap in the furnace.

2. The method according to claim 1, wherein the hot gas stream flows in the pre-heating step in a first direction; and
   wherein in the pre-heating step the first continuous flow of aluminum scrap is in the first direction.

3. The method according to claim 1, further comprising the step of:
   supplying hot combustible gases to the enclosed continuous circuit of the hot gas stream to replace in the hot gas stream a portion of the partial gas stream branched off from the hot gas stream.

4. The method according to claim 1, further comprising the step of:
   supplying hot exhaust gases from the furnace to the enclosed continuous circuit of the hot gas stream to replace in the hot gas stream a portion of the partial gas stream branched off from the hot gas stream.

5. An apparatus for performing the method according to claim 1, comprising a drier for the fragmentized aluminum scrap which can be supplied with hot gases and a furnace for smelting the aluminum scrap thermally treated in the drier (6), wherein the drier (6) connected to the furnace (1) is included in a hot gas circulation (13) from which a branch line (14) opens into the furnace (1).

6. An apparatus according to claim 5, wherein the hot gas circulation (13) comprises at least one burner (18).

7. An apparatus according to claim 5, wherein a feed line (15) for hot exhaust gases from the furnace opens into the hot gas circulation (13).

8. An apparatus according to claim 5, wherein the drier (6) comprises a conveyor (19) with a gas-permeable receptacle for the conveyed material, through which the hot gas stream guided in the circulation (13) can be drawn off.

9. An apparatus according to claim 5, wherein the drier (6) consists of a conveying section (7) for the aluminum scrap with the hot gas stream as the conveying means, and that a cyclone separator (10) for the heat-treated aluminum scrap is connected to the conveying section (7).

\* \* \* \* \*